(12) United States Patent
Chang et al.

(10) Patent No.: US 9,386,229 B2
(45) Date of Patent: Jul. 5, 2016

(54) IMAGE PROCESSING SYSTEM AND METHOD FOR OBJECT-TRACING

(71) Applicant: ALTEK SEMICONDUCTOR CORPORATION, Hsinchu (TW)

(72) Inventors: Wen-Yan Chang, Miaoli County (TW); Hong-Long Chou, Hsinchu County (TW); Yi-Hong Tseng, Hsinchu (TW); Tsan-Wei Wang, Taitung County (TW); Che-Lun Chuang, Hsinchu (TW)

(73) Assignee: ALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/551,200

(22) Filed: Nov. 24, 2014

(65) Prior Publication Data

US 2016/0105615 A1    Apr. 14, 2016

(30) Foreign Application Priority Data

Oct. 9, 2014    (TW) .............................. 103135120 A

(51) Int. Cl.
*H04N 5/262*    (2006.01)
*H04N 5/232*    (2006.01)

(52) U.S. Cl.
CPC ....... *H04N 5/23296* (2013.01); *H04N 5/23212* (2013.01); *H04N 5/23232* (2013.01); *H04N 5/23238* (2013.01); *H04N 5/2621* (2013.01); *H04N 5/2628* (2013.01)

(58) Field of Classification Search
CPC .......... H04N 5/23296; H04N 5/23232; H04N 5/2621; H04N 5/23212; H04N 5/2628; H04N 5/23238
USPC ...................... 348/61, 276, 177, 178, 240.99, 348/240.1–240.3, 179
See application file for complete search history.

(56) References Cited

U.S. PATENT DOCUMENTS

| | | | | |
|---|---|---|---|---|
| 2009/0322891 | A1* | 12/2009 | Kondo ................... | G06T 3/4038 348/218.1 |
| 2010/0103291 | A1* | 4/2010 | Koyama ................. | H04N 5/232 348/240.3 |
| 2012/0075489 | A1* | 3/2012 | Nishihara .......... | H04N 5/23296 348/222.1 |
| 2014/0211070 | A1* | 7/2014 | Uchida .................. | G03B 13/12 348/333.09 |

* cited by examiner

Primary Examiner — Yogesh Aggarwal
(74) Attorney, Agent, or Firm — Bacon & Thomas, PLLC

(57) ABSTRACT

An image processing system and a method for object-tracing are provided. The method includes: receiving a first wide field of view image and a first narrow field of view image, and determining a to-be-traced object therefrom and choosing one image therefrom for serving as a first output image; using an area size of the to-be-traced object in the first output image as a reference area; comparing the reference area with the area sizes of the to-be-traced object from a second wide field of view image and a second narrow field of view image respectively so as to determine one of that as a main image, and respectively zooming and deforming the main image and an area corresponding to the other image, and then fusing a zoomed and deformed second image as a second output image.

9 Claims, 5 Drawing Sheets

IMAGE PROCESSING SYSTEM AND METHOD FOR OBJECT-TRACING

CROSS-REFERENCE TO RELATED APPLICATION

This application claims priority from Taiwan Patent Application No. 103135120, filed on Oct. 9, 2014, in the Taiwan Intellectual Property Office, the content of which are hereby incorporated by reference in their entirety for all purposes.

BACKGROUND OF THE INVENTION

1. Field of the Invention

The present invention relates to an image processing system and a method for object-tracing, in particular with respect to an image processing system and a method for object-tracing by means of an imaging device using twin lens.

2. Description of the Related Art

When using electronic device having lenses, such as camera or smartphone to capture images of scenes, the captured images may include a main image (i.e. figure) and a background image (i.e. street view). If it wants to maintain size of the main image whilst show the diverse background images clearly, functions of the existing cameras and smartphones are not capable of effectively accomplishing the effect yet.

The shooting method, which keeps size of the main image being constant, is commonly seen in scenes of films. It makes use of zoom lens to change distance between lens and primary objects when shooting so as to only change the background image but size of the main object in the scene is maintained.

However, it is not easy to shoot the films with the effect by a photographer with a cell phone since he has to keep moving and zooming images simultaneously.

SUMMARY OF THE INVENTION

In as much as the preceding technical problems, one purpose of the present invention is to use device having twin lens to provide an image processing system and a method for object-tracing.

In view of the aforementioned technical problems, the other purpose of the present invention is to provide an image processing system and a method for object-tracing which enable a user maintaining size of the image in scene and keeping changing the background image while shooting films so as to promote the richness and interest of photographing.

According to the preceding purposes, the present invention is to provide an image processing method for object-tracing which may include: (a) receiving a first wide field of view image and a first narrow field of view image, and determining a to-be-traced object therefrom; (b) choosing a first output image from the first wide field of view image and the first narrow field of view image, and using an area size of the to-be-traced object in the first output image as a reference area; (c) receiving a second wide field of view image and a second narrow field of view image, and comparing the reference area with a wide field of view area size of the to-be-traced object in the second wide field of view image and a narrow field of view area size of the to-be-traced object in the second narrow field of view image respectively; (d) when the wide field of view area size is closer to the reference area, zooming and deforming the second wide field of view image according to a ratio of the wide field of view area size to the reference area, as well as zooming and deforming a corresponding area in the second narrow field of view image with respect to the wide field of view area size; (e) when the narrow field of view area size is closer to the reference area, zooming and deforming the second narrow field of view image according to a ratio of the narrow field of view area size to the reference area, as well as zooming and deforming a corresponding area in the second wide field of view image with respect to the narrow field of view area size; and (f) fusing the zoomed and deformed second wide field of view image and the corresponding area in the narrow field of view, or the zoomed and deformed second narrow field of view image and the corresponding area in the wide field of view to generate a second output image.

Preferably, the first wide field of view image and the second wide field of view image may be continuously captured by a wide-angle imaging lens, the first narrow field of view image and the second narrow field of view image may be continuously captured by a narrow-angle imaging lens, the wide-angle imaging lens and the narrow-angle imaging lens may be mounted on an imaging device, the first output image and the second output image may be continuous images stored in the imaging device when the imaging device may be at video recording mode, or continuous images displayed on a screen of the imaging device when the imaging device may be at preview mode.

Preferably, continuous images may demonstrate that the size of the to-be-traced object may be substantially unchanged, but scenes excluding the to-be-traced object may have zoomed in/out effect.

Preferably, a ratio of the wide field of view area to the reference area and a ratio of the narrow field of view area to the reference area are obtained respectively, and the one which is more proximate to 1 is regarded to be closer to the reference area.

Preferably, one of the wide field of view image and the narrow field of view image which possesses more image features of the to-be-traced object may be regarded to be closer to the reference area.

According to the preceding purpose, the present invention further provides an image processing system for object-tracing which may include: a first lens module configured to respectively capture a first wide field of view image and a second wide field of view image; a second lens module configured to respectively capture a first narrow field of view image and a second narrow field of view image; an object-tracing selection unit coupled to the first lens module and the second lens module and configured to determine a to-be-traced object from the first wide field of view image and the first narrow field of view image; a tracing-feature extraction unit coupled to the object-tracing selection unit configured to extract a plurality of first image features of the to-be-traced object; an object-tracing unit coupled to the first lens module, the second lens module, the object-tracing selection unit and the tracing-feature extraction unit and configured to trace the to-be-traced object in the first wide field of view image, the second wide field of view image, the first narrow field of view image and the second narrow field of view image according to the plurality of first image features respectively, and determine a wide field of view area size of the to-be-traced object in the second wide field of view image and a narrow field of view area size of the to-be-traced object in the second narrow field of view image; a feature extraction unit coupled to the object-tracing unit and configured to extract plurality of image features in the second wide field of view image and the second narrow field of view image respectively so as to determine an corresponding area of the second wide field of view image and the second narrow field of view image; an image zooming and distortion unit coupled to the feature extraction unit and configured to select a first output image from the first wide field of view image and the first narrow field of view image, and determine an area size of the to-be-traced object in the first output image as a reference area, and comparing the reference area with the wide field of view area size and the narrow field of view area size; wherein when the image zooming and distortion unit determines that the wide field of view area size is closer to the reference area, the image zooming and distortion unit zooms and deforms the second wide field of view image according to a ratio of the wide field of view area size to the reference area, as well as zooms and deforms a corresponding area in the second narrow field of view image with respect to the wide field of view area size; when the image zooming and distortion unit determines that the narrow field of view area size is closer to the reference area, the image zooming and distortion unit zooms and deforms the second narrow field of view according to a ratio of the narrow field of view area size to the reference area, as well as zooms and deforms a corresponding area in the second wide field of view image with respect to the narrow field of view area size; and an image fusing unit coupled to the image zooming and distortion unit and configured to fuse the zoomed or deformed second wide field of view image and the corresponding area in the second narrow field of view image, or the zoomed or deformed second narrow field of view image and the corresponding area in the wide field of view image to generate a second output image.

Preferably, a ratio of the wide field of view area to the reference area and a ratio of the narrow field of view area to the reference area are obtained respectively, and the one which is more proximate to 1 is regarded to be closer to the reference area.

Preferably, a ratio of the wide field of view area to the reference area and a ratio of the narrow field of view area to the reference area are obtained respectively, and the one which is more proximate to 1 is regarded to be closer to the reference area.

Preferably, the image zooming and distortion unit may predetermine a ratio threshold value and when the image zooming and distortion unit determines that the wide field of view area size is closer to the reference area and a ratio of the wide field of view area size to the reference area is larger than the ratio threshold value, the second wide field of view image may be zoomed in and deformed.

Preferably, the image zooming and distortion unit may predetermine a ratio threshold value and when the image zooming and distortion unit determines that the narrow field of view area size is closer to the reference area and a ratio of the narrow field of view area size and the reference area is larger than the ratio threshold value, the second narrow field of view image may be zoomed out and deformed.

BRIEF DESCRIPTION OF THE DRAWINGS

Hereinafter, embodiments of the present invention will be described in detail with reference to the accompanying drawings so that those skilled in the art to which the present invention pertains can realize the present invention, wherein.

DETAILED DESCRIPTION OF THE PREFERRED EMBODIMENTS

As used herein, the term "and/or" includes any and all combinations of one or more of the associated listed items. Expressions such as "at least one of," when preceding a list of elements, modify the entire list of elements and do not modify the individual elements of the list.

Figure 1:
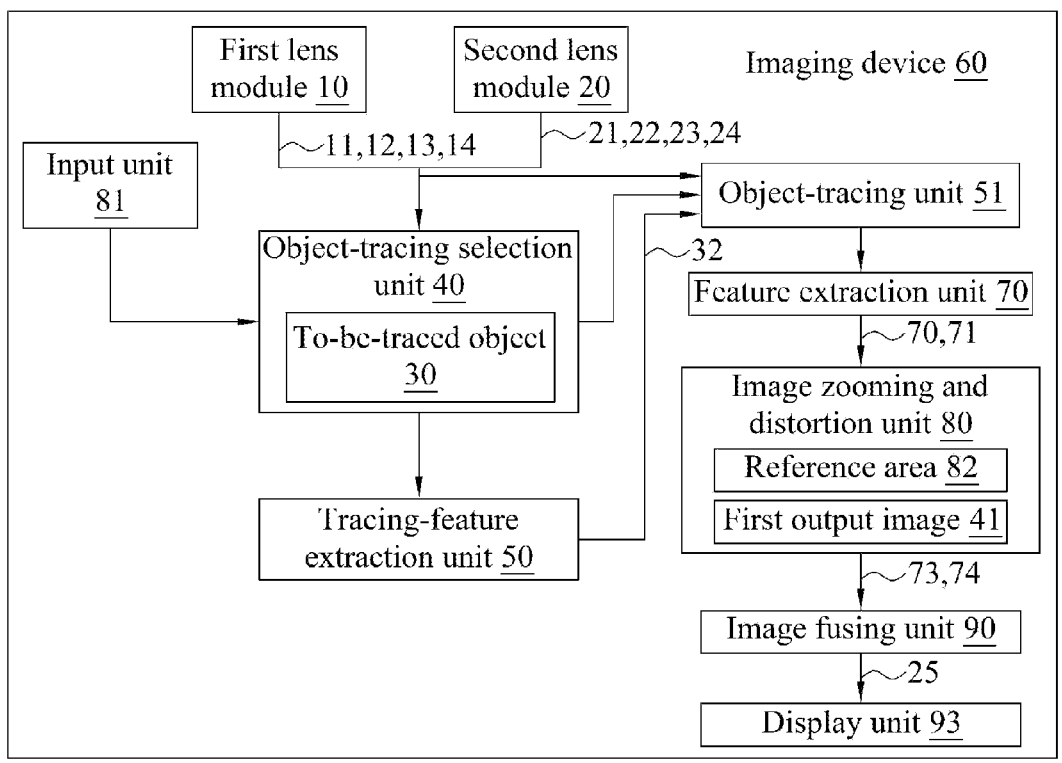
FIG. 1 is a block diagram of an embodiment of an image processing system for object-tracing according to the present invention.
Figure 2:
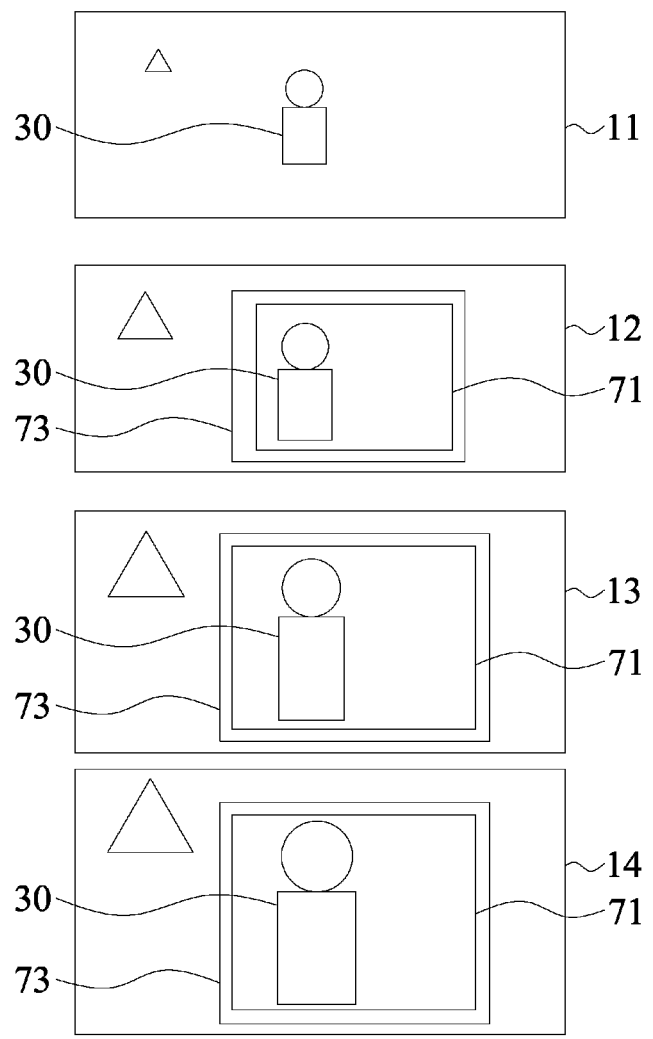
FIG. 2 is a first schematic diagram of an embodiment of an image processing system for object-tracing according to the present invention.
Figure 3:
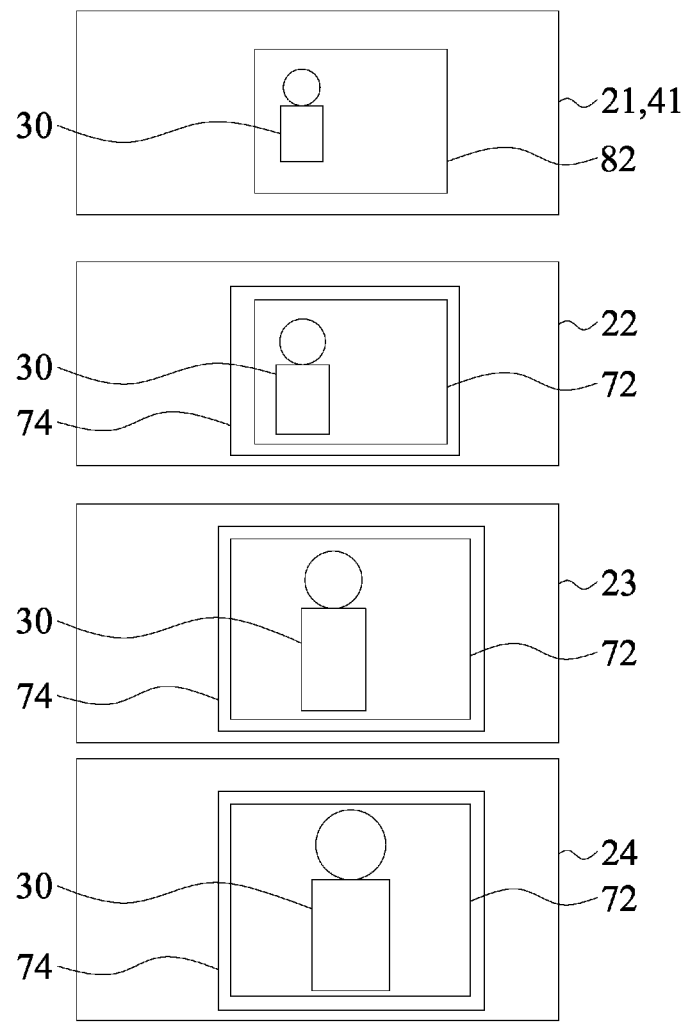
FIG. 3 is a second schematic diagram of an embodiment of an image processing system for object-tracing according to the present invention.

Please refer to FIGS. 1, 2 and 3 which are respectively a block diagram, first schematic diagram and second schematic diagram of an embodiment of an image processing system for object-tracing according to the present invention. In FIG. 1, the image processing system for object-tracing may include a first lens module 10, a second lens module 20, an object-tracing selection unit 40 coupling to the first lens module 10 and the second lens module 20, a tracing-feature extraction unit 50 coupling to the object-tracing selection unit 40, an object-tracing unit 51 coupling to the first lens module 10, the second lens module 20, the object-tracing selection unit 40 and the tracing-feature extraction unit 50, a feature extraction unit 70 coupling to the object-tracing unit 51, an image zooming and distortion unit 80 coupling to the feature extraction unit 70, an image fusing unit 90 coupling to the image zooming and distortion unit 80 and a display unit 93 coupling to the coupled to the image zooming and distortion unit 80. The image processing system for object-tracing according to the present invention may be operated on an imaging device 60; the first lens module 10 and the second lens module 20 may be mounted at the same side of the imaging device 60 and may be guided toward the same direction.

The object-tracing selection unit 40, the tracing-feature extraction unit 50, the object-tracing unit 51, the feature extraction unit 70, the image zooming and distortion unit 80, and the image fusing unit 90 may be the processing units embedded in the imaging device 60 and may be executed by software way. For example, the object-tracing selection unit 40, the tracing-feature extraction unit 50, the object-tracing unit 51, the feature extraction unit 70, the image zooming and distortion unit 80, and the image fusing unit 90 respectively may belong to the executable program codes of the processing units; or they may be executed by hardware way. The object-tracing selection unit 40, the tracing-feature extraction unit 50, the object-tracing unit 51, the feature extraction unit 70, the image zooming and distortion unit 80, and the image fusing unit 90 may be the specific circuits inside the processing units. The processing units may be a CPU or a MCU. The executable program code of the processing units may be store in HD, RAM or ROM.

The first lens module 10 and the second lens module 20 respectively may have diverse focal length. For example, in the present embodiment, the first lens module 10 may be a wide-angle lens and the second lens module 20 may be a long focal-length lens. Wherein, the first lens module 10 respectively may capture a plurality of wide field of view images, 11, 12, 13, and 14 as shown in FIG. 2. The second lens module 20 may respectively capture a plurality of narrow field of view images, 21, 22, 23, and 24 as shown in FIG. 3. As FIG. 2 shows, field of view captured by the first lens module 10 may be larger than that captured by the second lens module 20, and sizes of the wide field of view images 11, 12, 13, 14 of the same object shown in FIG. 2 may be smaller than that of the narrow field of view images 21, 22, 23, 24 shown in FIG. 3.

The object-tracing selection unit 40 may determine the to-be-traced object 30 from a first wide field of view image 11 and/or a first narrow field of view image 21. In practice, the object-tracing selection unit 40 may identify the interesting object which coexists in the first wide field of view image 11 and the first narrow field of view image 21 according to at least one image feature, such as person's face, body or specific object. Following, the object-tracing selection unit 40 may automatically determine the to-be-traced object 30 from multiple interesting objects; or the object-tracing selection unit 40 may determine the to-be-traced object 30 from the multiple interesting objects according to the command sent by an input unit 81, that is, a user may use the input unit 81 to select the to-be-traced object 30.

In addition, the user can further use the input unit 81 to input display size of the to-be-traced object 30 shown on the display unit 93.

Following, when the to-be-traced object 30 is determined, the tracing-feature extraction unit 50 may extract a plurality of image features 32 of the to-be-traced object 30, and the plurality of image features 32 may trace the to-be-traced object 30 in the follow-up images.

The object-tracing unit 51 may trace the to-be-traced object 30 in the images respectively inputted by the first lens module 10 and the second lens module 20 according to the plurality of first image feature 32 provided by the tracing-feature extraction unit 50. For example, the object-tracing unit 51 can determine a wide field of view area size 71 of the to-be-traced object 30 in the a plurality of second wide field of view images according to the plurality of first image features 32 provided by the tracing-feature extraction unit 50, that is, the area where the to-be-traced object 30 may be; and may determine a narrow field of view area size 72 of the to-be-traced object 30 in the plurality of narrow field of view images, namely, the area where the to-be-traced object 30 may be.

The feature extraction unit 70 may extract a plurality of image features through the images inputted by the first lens module 10 and the second lens module 20, and the plurality of image features may belong to the image features of the images which the first lens module 10 and the second lens module 20 may include in common, and may be used to compare the corresponding areas respectively in the wide field of view image of the first lens module 10 and in the narrow field of view image of the second lens module 20.

The image zooming and distortion unit 80 may select the wide field of view image of the first lens module 10 or the narrow field of view of the second lens module 20 as a first output image 41 according to display size of the to-be-traced object 30 provided by the input unit 81 or set by the system, and the area size of the to-be-traced object 30 in the first output image 41 may be served as a reference area 82. Next, in the follow-up shot images, the image zooming and distortion unit 80 may compare the reference area 82 with the wide field of view area size 71 and the narrow field of view area size 72. When the image zooming and distortion unit 80 determines that the wide field of view area size 71 is closer to the reference area 82, it may zoom and deform the second wide field of view images 12, 13, 14 according to a relative ratio of the wide field of view area size 71 and the reference area 82, as well as respectively zoom and deform a correspond area 74 in the second field of view images 22, 23, 24 with respect to the wide field of view area size, and the zoomed and/or deformed second wide field of view images 12, 13, 14 and the corresponding area 74 may be fused in the image fusing unit 90 to generate three continuous second output images 25. On the other hand, wherein when the image zooming and distortion unit 80 determines the narrow field of view area size 72 is closer to the reference area 82, it may respectively zoom and deform the second narrow field of view images 22, 23, 24 according to a relative ratio of the narrow field of view area size 72 and the reference area 82, as well as zoom and deform the corresponding area 73 in the second wide field of view images 12, 13, 14 with respect to the narrow field of view area size 72. Similarly, the zoomed and/or deformed second narrow field of view images 22, 23, 24 and the corresponding area 73 may be fused in the image fusing unit 90 to generate three continuous second output images 25 as an output.

What needs to be addressed here is that the first lens module 10 and the second lens module 20 may be configured to image multiple images continuously, so, the plurality of images outputted to the display unit 93 via the preceding process may constitute a video image. As a result, the imaging device 60 of the present invention may be used to output a video image having a constant main image (to-be-traced object 30).

Figure 4:
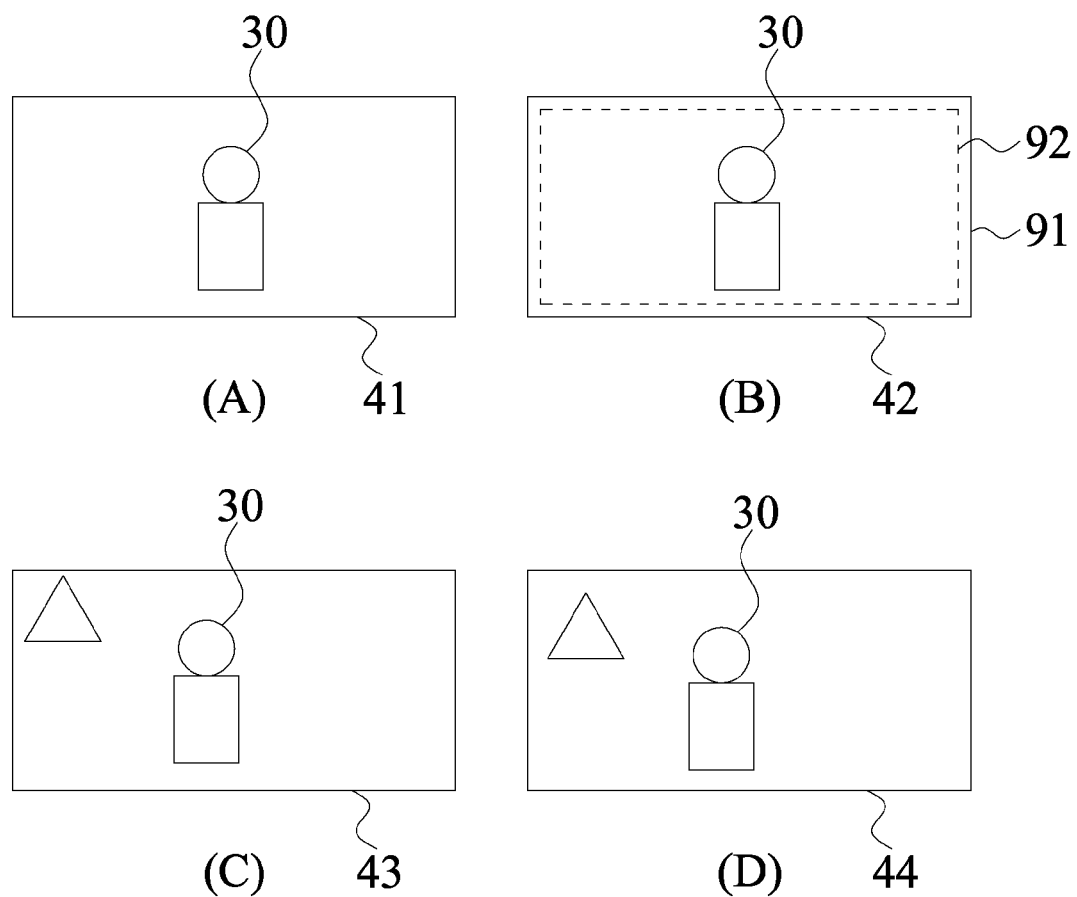
FIG. 4 is a third schematic diagram of an embodiment of an image processing system for object-tracing according to the present invention.

Please refer to FIGS. 2, 3 and 4 which are first to third schematic diagrams of an embodiment of an image processing system for object-tracing according to the present invention, and the explanation of FIG. 1 together. Firstly, the object-tracing selection unit 40 may determine the to-be-traced object 30 in the first wide field of view image 11 shown in FIG. 2 and the first narrow field of view image 21 shown in FIG. 3, and the image zooming and distortion unit 80 may determine using the first wide field of view image 11 or the first narrow field of view image 21 as the first output image 41, and the area size of the to-be-traced object 30 in the first output image 41 may be used as the reference area 82. The present embodiment may take the first narrow field of view image 21 as the first output image 41 for example.

Next, the tracing-feature extraction unit 50 may extract the plurality of image features 32 of the to-to-traced object 30 from the first wide field of view image 11 shown in FIG. 2 and from the first narrow field of view image 21 shown in FIG. 3. The object-tracing unit 51 may trace the to-to-traced object 30 respectively in the second wide field of view images 12, 13, 14 shown in FIG. 2 and the second narrow field of view images 22, 23, 24 shown in FIG. 3 according to the plurality of first image features 32 provided by the tracing-feature extraction unit 50. For example, the object-tracing unit 51 may determine the wide field of view area size 71 in the plurality of second wide field of view images 12, 13, 14 according to the plurality of first image features 32 provided by the tracing-feature extraction unit 50, namely, the area where the to-to-traced object 30 may be; and may determine the narrow field of view area size 72 in the plurality of narrow field of view images 22, 23, 24, that is, the area where the to-to-traced object 30 may be.

Following, the feature extraction unit 70 may trace the plurality of image features in the plurality of second wide field of view images 12, 13, 14 and the plurality of narrow field of view images 22, 23, 24. The plurality of image features may be the image feature which the first lens module 10 and the second lens module 20 may include in common for comparing the corresponding areas 73, 74 in the wide field of view image of the first lens module 10 and the narrow field of view image of the second lens module 20. The goal is to determine the areas of the second narrow field of view images 22, 23, 24 which may respectively correspond with the second wide field of view images 12, 13, 14.

Furthermore, the image zooming and distortion unit 80 may compare the reference area 82 with the wide field of view area size 71 and the narrow field of view area size 72 to determine which size may be closer to the reference size 82. In practice, the image zooming and distortion unit 80 may use the sizes of these areas and that of the reference area 82 as the comparison. For example, a ratio of the wide field of view area 71 to the reference area 82 and a ratio of the narrow field of view area 72 to the reference area 82 are obtained respectively, and the one which is more proximate to 1 is regarded to be closer to the reference area 82. For instance, area size of the to-be-traced object 30 in the narrow field of view area size 72 may be a multiple of 1.2 of the reference area 82, and area size of the to-be-traced object 30 in the wide field of view area size 71 may be a multiple of 0.95 of the reference area 82. 0.95 may be closer to 1 than 1.2, and thus the image zooming and distortion unit 80 uses the second wide field of view image 12 as the main image for serving as the follow-up associative processing.

Alternatively, the image zooming and distortion unit 80 may use amount of image features in these areas and that in the reference area 82 as the comparison. For example, when the first lens module 10 and the second lens module 20 are close toward the to-be-shot object, a part of the object in the second narrow field of view image 22 may not be captured as frame-out, that is, indicating that certain image features may be not shown in the image and the zooming and distortion unit 80 therefore doesn't fit into this type of follow-up process to these images. As a result, the image zooming and distortion unit 80 may select the amount of image features that may be close to the reference area 80 as the follow-up process.

The preceding contents take size of image area or amount of image feature as examples, but the present invention shall not be subject to this restriction. In addition, usage of area size or amount of image feature can be a hybrid application.

When the image zooming and distortion unit 80 determines that the to-be-traced object 30 in the narrow field of view area size 72 of the second narrow field of view image 22 is closer to the reference area 82, the image zooming and distortion unit 80 may zoom and deform the second narrow field of view image 22 according to a relative ratio of the narrow field of view area size 72 and the reference area 82, as well as zoom and deform the corresponding area 73 in the second wide field of view image 12 with respect to the narrow field of view area size 72; to the contrary, if the to-be-traced object 30 in the wide field of view area size 71 of the second wide field of view image 12 is closer to the reference area 82, the image zooming and distortion unit 80 may zoom and deform the second wide field of view 12 according to a relative ratio of the wide field of view area size 71 and reference area 82, as well as zoom and deform the corresponding area 74 in the second narrow field of view image 22 with respect to the wide field of view area size 71.

Finally, the image fusing unit 90 may fuse the zoomed and/or deformed second narrow field of view image 22 and the corresponding area 73 to generate a second output image 25, and the second output image 25 may demonstrate that the size of the to-be-traced object 30 may be unchanged substantially, but the scene excluding the to-be-traced object 30 may have zooming effect.

Moreover, FIGS. 2 and 3 simulate the imaging device 60 approaching to the to-be-traced object 30 gradually. The sizes of the to-be-traced object 30 in the original first narrow field of view image 21, the second narrow field of view images 22, 23, 24, the first wide field of view image 11 and the second wide field of view images 12, 13, 14 may become larger gradually, and the wide field of view images may have all the objects shown in the narrow field of view images. In FIG. 4A, the first output image 41 may be generated from the first narrow field of view image 21, and FIGS. 4B and 4C respectively demonstrate the different second output images 42, 43, and the second output image 42 may be a combined image of the zoomed-out second narrow field of view image 22 (dotted line frames 92 indicate range of the zoomed-out second narrow field of view image 22, and a supplemented area 91 may be used to fill the gap between the second output image 42 and the zoomed-out second narrow field of view image 22) and the wide field of view corresponding area 73 of the second wide field of view image 12. In the FIG. 4C, the second output image 43 may be generated by fusing the zoomed and deformed second wide field of view image 13 and the narrow field of view corresponding area (not shown in FIGS.) of the second narrow field of view image 23; at this moment, other than the to-be-traced object 30, a triangle object also can be seen in the background of the second output image 43. It can be found through FIGS. 4B and 4C that the to-be-traced object 30 may have little change in its size, but a larger difference in scene thereof.

Furthermore, as FIG. 4D shows, if the wide field of view area size 71 of the second wide field of view image 13 is closer to the size of the reference area 82, the second wide field of view 13 may be zoomed and deformed according to a ratio of the wide field of view area size 71 and the reference area 82; if the user desires to zoom in the second output image 44 by a multiple of 1.5, the corresponding area (not shown in FIGS.) in the second narrow field of view 23 corresponding to the wide field of view area size 71 may be simultaneously zoomed in to the corresponding size, i.e. a multiple of 1.5, and the zoomed-in narrow field of view corresponding area and the second wide field of view image 13 may be fused to boost the entire image quality which is zoomed-in by a multiple of 1.5 of the second output image 44.

In practice, the image zooming and distortion unit 80 may predetermine a ratio threshold value, and when the image zooming and distortion unit 80 determines that the wide field of view area size 71 of the to-be-traced object 30 in the second wide field of view image 12 is closer to the reference area 82 and a ratio of the wide field of view area size 71 to the reference area 82 is smaller than the ratio threshold value, the second wide field of view image 12 and the second narrow field of view image 22 may be fused to generate the first output image 41 and then the follow-up image process may be executed.

Figure 5:
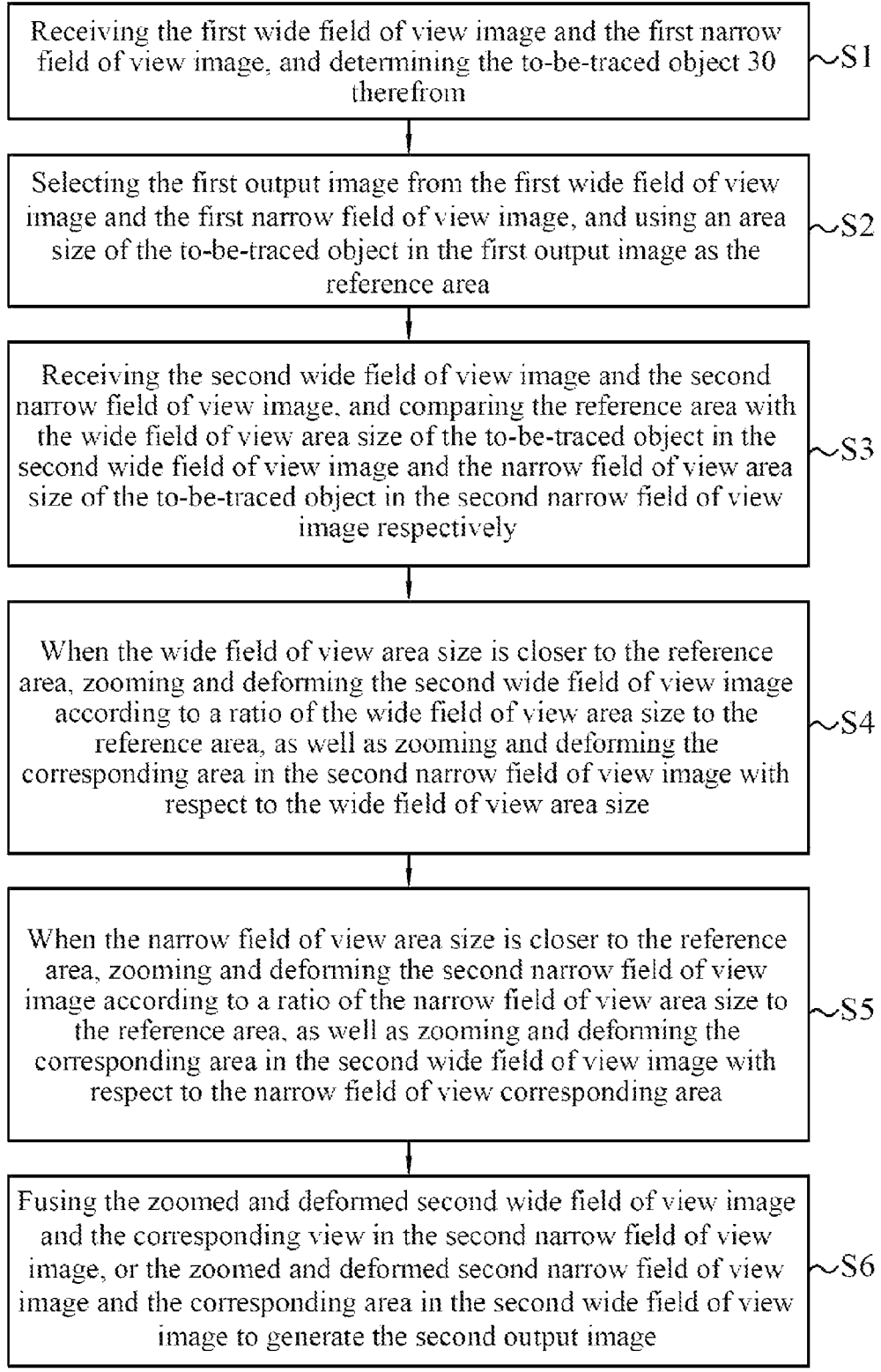
FIG. 5 is a flow chart of an embodiment of an image processing method for object-tracing according to the present invention.

Please refer to FIG. 5 which is a flow chart of an embodiment of an image processing method for object-tracing according to the present invention. Please refer to FIG. 1 together; the image processing method for object-tracing may include the following steps.

In step S1, receiving the first wide field of view image 11 and the first narrow field of view image 21, and determining the to-be-traced object 30 therefrom.

In step S2, selecting the first output image 41 from the first wide field of view image 11 and the first narrow field of view image 21, and using an area size of the to-be-traced object 30 in the first output image 41 as the reference area 82.

In step S3, receiving the second wide field of view image 12 and the second narrow field of view image 22, and comparing the reference area 82 with the wide field of view area size 71 of the to-be-traced object 30 in the second wide field of view image 12 and the narrow field of view area size 72 of the to-be-traced object 30 in the second narrow field of view image 22 respectively.

In step S4, when the wide field of view area size 71 is closer to the reference area 82, zooming and deforming the second wide field of view image 12 according to a ratio of the wide field of view area size 71 to the reference area 82, as well as zooming and deforming the corresponding area 74 in the second narrow field of view image 22 with respect to the wide field of view area size 71.

In step S5, when the narrow field of view area size 72 is closer to the reference area 82, zooming and deforming the second narrow field of view image 22 according to a ratio of the narrow field of view area size 72 to the reference area 82, as well as zooming and deforming the corresponding area 73 in the second wide field of view image 12 with respect to the narrow field of view corresponding area 72.

In step S6, fusing the zoomed and deformed second wide field of view image 12 and the corresponding view 74 in the second narrow field of view image 22, or the zoomed and deformed second narrow field of view image 22 and the corresponding area 73 in the second wide field of view image 12 to generate the second output image 25.

The first wide field of view image 11 and the second wide field of view image 12 may be continuously captured by a wide-angle imaging lens, the first narrow field of view image 21 and the second narrow field of view image 22 may be continuously captured by a narrow-angle imaging lens, the wide-angle imaging lens and the narrow-angle imaging lens may be mounted on the imaging device 60, and the second output image 25 may be continuous images stored in the imaging device 60 when the imaging device 60 is at video recording mode, or continuous images displayed on a screen of the imaging device 60 when the imaging device 60 is at preview mode.

The continuous images may demonstrate that the size of the to-be-traced object 30 is unchanged substantially, but the scene excluding the to-be-traced object 30 per se may have zooming effect.

Wherein, a ratio of the wide field of view area 71 to the reference area 82 and a ratio of the narrow field of view area 72 to the reference area 82 are obtained respectively, and the one which is more proximate to 1 is regarded to be closer to the reference area 82.

One of the wide field of view image and the narrow field of view image which possesses more image features of the to-be-traced object 30 is regarded to be closer to the reference area 82.

Additionally, in practice, it can predetermine a ratio threshold value, and in the step S4, when the to-be-traced object 30 in the wide field of view area size 71 is closer to the reference area 82 and a ratio of the to-be-traced object 30 in the wide field of view area size 71 to the reference area 82 may be larger than the ratio threshold value, and the second wide field of view image 12 may be zoomed in and deformed.

In step S5, when the area size of the to-be-traced object 30 in the second narrow field of view image 22 is closer to the reference area 82 and a ratio of the area size of the to-be-traced object 30 in the second narrow field of view image 22 to the reference area 82 is larger than the ratio threshold value, the second narrow field of view image 22 may be zoomed out and deformed.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. An image processing method for object-tracing, comprising:
    (a) receiving a first wide field of view image and a first narrow field of view image, and determining a to-be-traced object therefrom;
    (b) choosing a first output image from the first wide field of view image and the first narrow field of view image, and using an area size of the to-be-traced object in the first output image as a reference area;
    (c) receiving a second wide field of view image and a second narrow field of view image, and comparing the reference area with a wide field of view area size of the to-be-traced object in the second wide field of view image and a narrow field of view area size of the to-be-traced object in the second narrow field of view image respectively;
    (d) when the wide field of view area size is closer to the reference area, zooming and deforming the second wide field of view image according to a ratio of the wide field of view area size to the reference area, as well as zooming and deforming a corresponding area in the second narrow field of view image with respect to the wide field of view area size;
    (e) when the narrow field of view area size is closer to the reference area, zooming and deforming the second narrow field of view image according to a ratio of the narrow field of view area size to the reference area, as well as zooming and deforming corresponding area in the second wide field of vie image with respect to the narrow field of view area size; and
    (f) fusing the zoomed and deformed second wide field of view image and the corresponding area in the narrow field of view, or the zoomed and deformed second narrow field of view image and the corresponding area in the wide field of view to generate a second output image.

2. The method of claim 1, wherein the first wide field of view image and the second wide field of view image are continuously captured by a wide-angle imaging lens, the first narrow field of view image and the second narrow field of view image are continuously captured by a narrow-angle imaging lens, the wide-angle imaging lens and the narrow-angle imaging lens are mounted on an imaging device, the first output image and the second output image are continuous images stored in the imaging device when the imaging device is at video-recording mode, or continuous images displayed on a screen of the imaging device when the imaging device is at preview mode.

3. The method of claim 1, wherein a ratio of the wide field of view area to the reference area and a ratio of the narrow field of view area to the reference area are obtained respectively, and the one which is more proximate to 1 is regarded to be closer to the reference area.

4. The method of claim 1, wherein one of the wide field of view image and the narrow field of view image which possesses more image features of the to-be-traced object is regarded to be closer to the reference area.

5. An image processing system for object-tracing, comprising:
    a first lens module, configured to respectively capture a first wide field of view image and a second wide field of view image;
    a second lens module, configured to respectively capture a first narrow field of view image and a second narrow field of view image;
    an object-tracing selection unit, coupled to the first lens module and the second lens module and configured to determine a to-be-traced object from the first wide field of view image and the first narrow field of view image;
    a tracing-feature extraction unit, coupled to the object-tracing selection unit and configured to extract a plurality of first image features of the to-be-traced object;
    an object-tracing unit, coupled to the first lens module, the second lens module, the object-tracing selection unit and the tracing-feature extraction unit and configured to trace the to-be-traced object in the first wide field of view image, the second wide field of view image, the first narrow field of view image and the second narrow field of view image according to the plurality of first image features respectively, and determine a wide field of view area size of the to-be-traced object in the second wide field of view image and a narrow field of view area size of the to-be-traced object in the second narrow field of view image;

a feature extraction unit, coupled to the object-tracing unit and configured to extract plurality of image features in the second wide field of view image and the second narrow field of view image respectively so as to determine an corresponding area of the second wide field of view image and the second narrow field of view image;

an image zooming and distortion unit, coupled to the feature extraction unit and configured to select a first output image from the first wide field of view image and the first narrow field of view image, and determine an area size of the to-be-traced object in the first output image as a reference area, and comparing the reference area with the wide field of view area size and the narrow field of view area size; wherein when the image zooming and distortion unit determines that the wide field of view area size is closer to the reference area, the image zooming and distortion unit zooms and deforms the second wide field of view image according to a ratio of the wide field of view area size to the reference area, as well as zooms and deforms a corresponding area in the second narrow field of view image with respect to the wide field of view area size; when the image zooming and distortion unit determines that the narrow field of view area size is closer to the reference area, the image zooming and distortion unit zooms and deforms the second narrow field of view according to a ratio of the narrow field of view area size to the reference area, as well as zooms and deforms a corresponding area in the second wide field of view image with respect to the narrow field of view area size; and an image fusing unit, coupled to the image zooming and distortion unit and configured to fuse the zoomed, or deformed second wide field of view image and the corresponding area in the second narrow field of view image or the zoomed or deformed second narrow field of view image and the corresponding area in the wide field of view image to generate a second output.

6. The image processing system of claim 5, wherein a ratio of the wide field of view area to the reference area and a ratio of the narrow field of view area to the reference area are obtained respectively, and the one which is more proximate to 1 is regarded to be closer to the reference area.

7. The image processing system of claim 5, wherein one of the wide field of view image and the narrow field of view image which possesses more image features of the to-be-traced object is regarded to be closer to the reference area.

8. The image processing system of claim 5, wherein the image zooming and distortion unit predetermines a ratio threshold value and when the image zooming and distortion unit determines that the wide field of view area size is closer to the reference area and a ratio of the wide field of view area size to the reference area is larger than the ratio threshold value, the second wide field of view image is zoomed in and deformed.

9. The image processing system of claim 5, wherein the image zooming and distortion unit predetermines a ratio threshold value and when the image zooming and distortion unit determines that the narrow field of view area size is closer to the reference area and a ratio of the narrow field of view area size to the reference area is larger than the ratio threshold value, the second narrow field of view image is zoomed out and deformed.

* * * * *